(12) United States Patent
Lee

(10) Patent No.: US 11,932,052 B2
(45) Date of Patent: Mar. 19, 2024

(54) DRIVING APPARATUS MAINTAINING GROUND CONTACT OF DRIVE-WHEEL

(71) Applicant: MOTION DEVICE INC., Anyang-si (KR)

(72) Inventor: Jong Chan Lee, Anyang-si (KR)

(73) Assignee: MOTION DEVICE INC., Anyang-si (KR)

( * ) Notice: Subject to any disclaimer, the term of this patent is extended or adjusted under 35 U.S.C. 154(b) by 723 days.

(21) Appl. No.: 17/055,099

(22) PCT Filed: Dec. 27, 2019

(86) PCT No.: PCT/KR2019/018623
§ 371 (c)(1),
(2) Date: Nov. 12, 2020

(87) PCT Pub. No.: WO2021/095986
PCT Pub. Date: May 20, 2021

(65) Prior Publication Data
US 2021/0362547 A1   Nov. 25, 2021

(30) Foreign Application Priority Data
Nov. 11, 2019   (KR) ................. 10-2019-0143179

(51) Int. Cl.
*B60P 3/00*          (2006.01)
*B60B 35/00*         (2006.01)
*B60B 35/10*         (2006.01)
(52) U.S. Cl.
CPC ........ *B60B 35/1018* (2013.01); *B60B 35/003* (2013.01); *B60P 3/00* (2013.01)

(58) Field of Classification Search
CPC ....... B60B 35/1018; B60B 35/003; B60P 3/00
See application file for complete search history.

(56) References Cited

U.S. PATENT DOCUMENTS 6,371,505 B1 * 4/2002 Turner, II ................ B60P 3/00
                                            280/425.2
8,210,556 B2   7/2012 Zhou et al.
(Continued)

FOREIGN PATENT DOCUMENTS

KR    101642728 B1    7/2016
KR    20180067640 A   6/2018

OTHER PUBLICATIONS

International Search Report of PCT/KR2019/018623, dated Aug. 3, 2020.

*Primary Examiner* — Saul Rodriguez
*Assistant Examiner* — Willie W Berry, Jr.
(74) *Attorney, Agent, or Firm* — STIP Law Group, LLC

(57) ABSTRACT

Provided herein is a driving apparatus for transporting a loaded object, which allows a drive-wheel to always be in contact with the ground even when the ground is uneven. The driving apparatus includes a loading plate (140, 240) on which a loaded object is loaded, a first support (110, 210) connected to a lower portion of one side of the loading plate (140, 240), a second support (120, 220) connected to a lower portion of the other side of the loading plate (140, 240), a hinge (130, 230) configured to connect the first support (110, 210) to the second support (120, 220) in a hinge structure, at least a pair of drive-wheels (160, 260) coupled to both sides of a lower portion of the second support (120, 220), and a driver configured to rotate and drive the drive-wheels (160, 260).

10 Claims, 10 Drawing Sheets

(56) References Cited

U.S. PATENT DOCUMENTS

| | | |
|---|---|---|
| 10,336,380 B2 | 7/2019 | Sakashita et al. |
| 2007/0246901 A1 | 10/2007 | Houser et al. |
| 2019/0263463 A1 | 8/2019 | Moulin et al. |

* cited by examiner

[FIG.1]
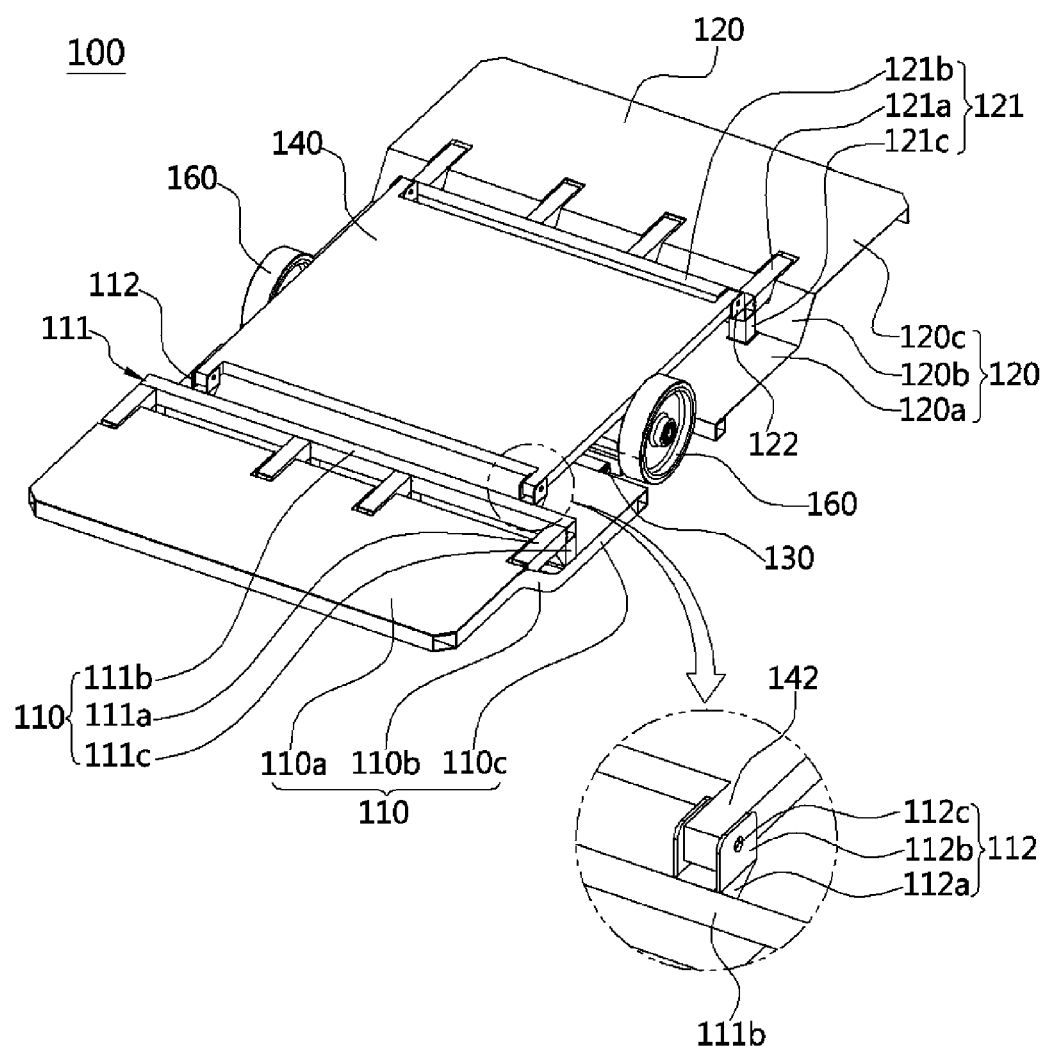

[FIG.2]
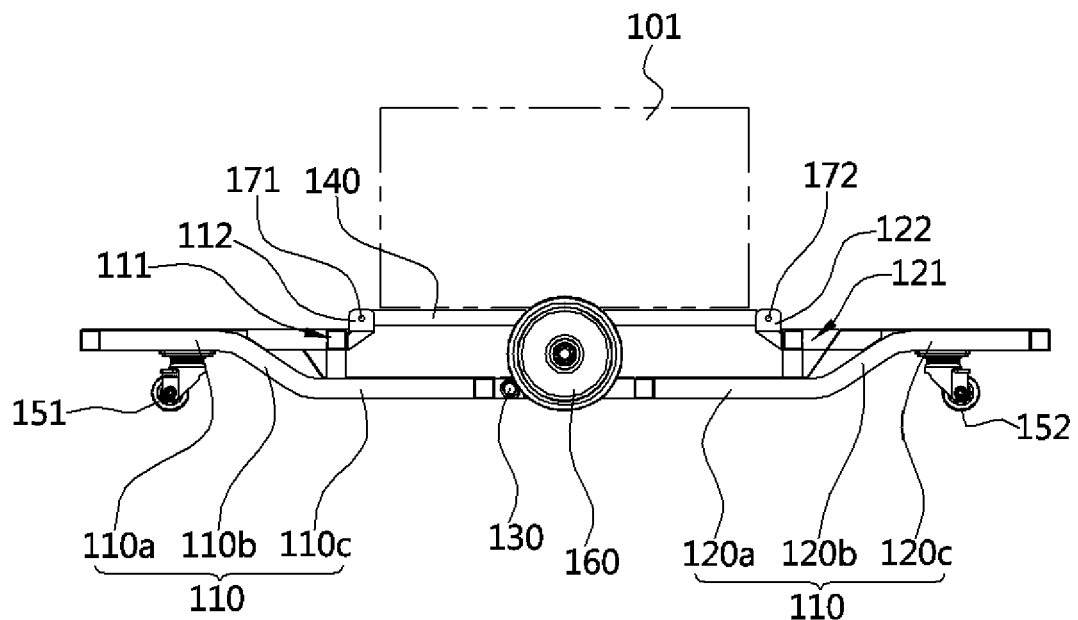
[FIG.3]
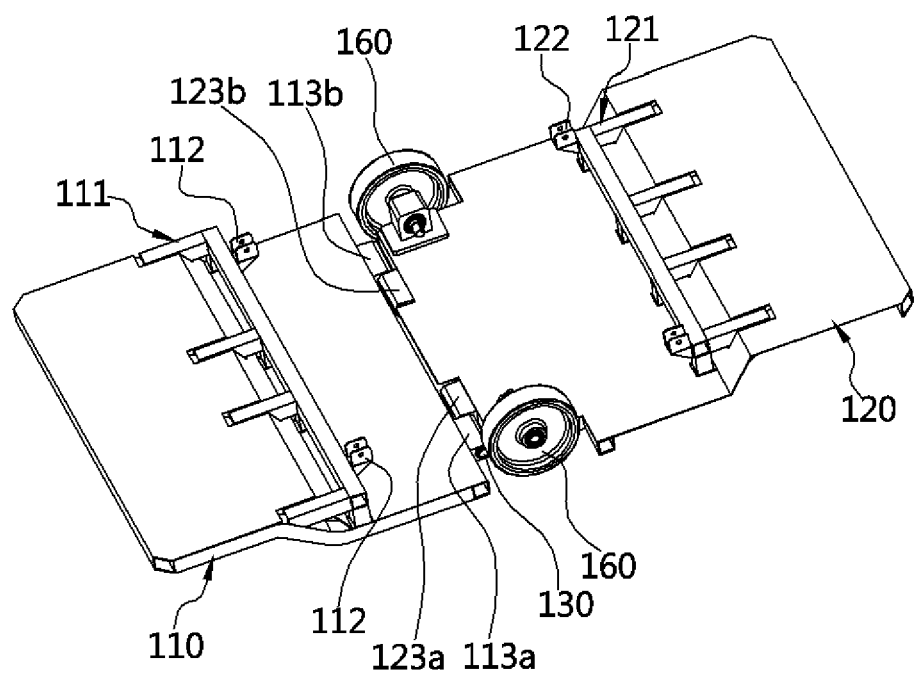

[FIG.4]
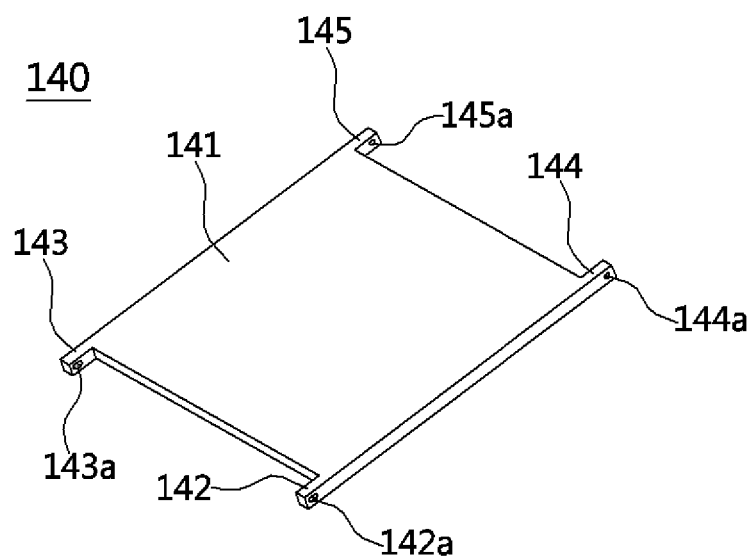
[FIG.5A]
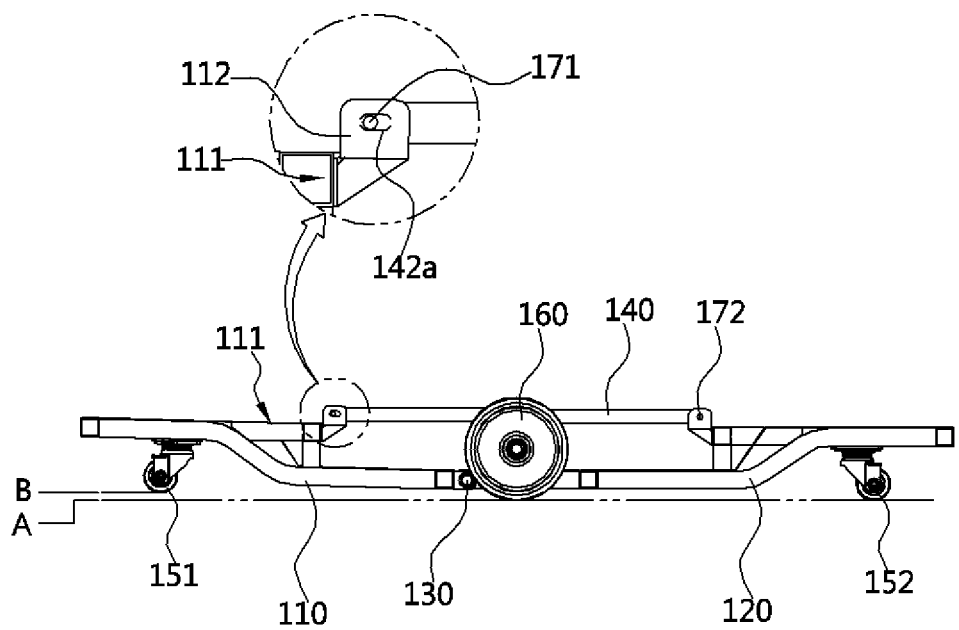

[FIG.5B]
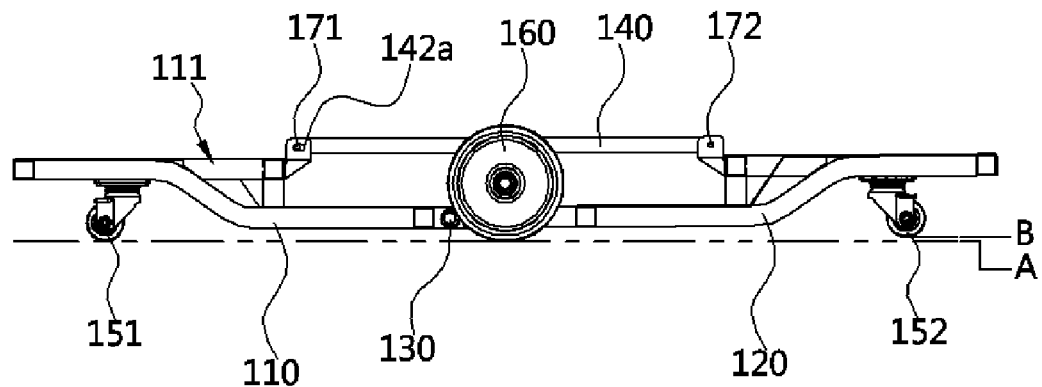
[FIG.6]
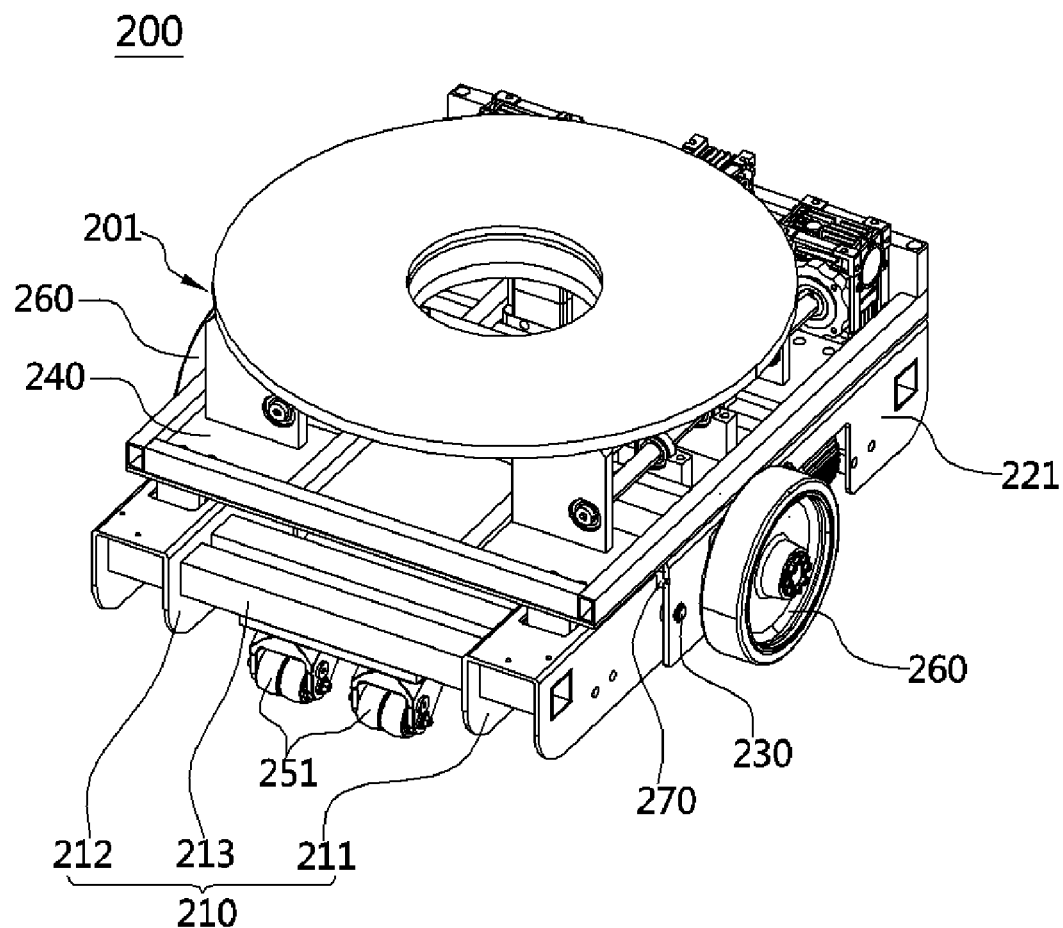

[FIG.7]
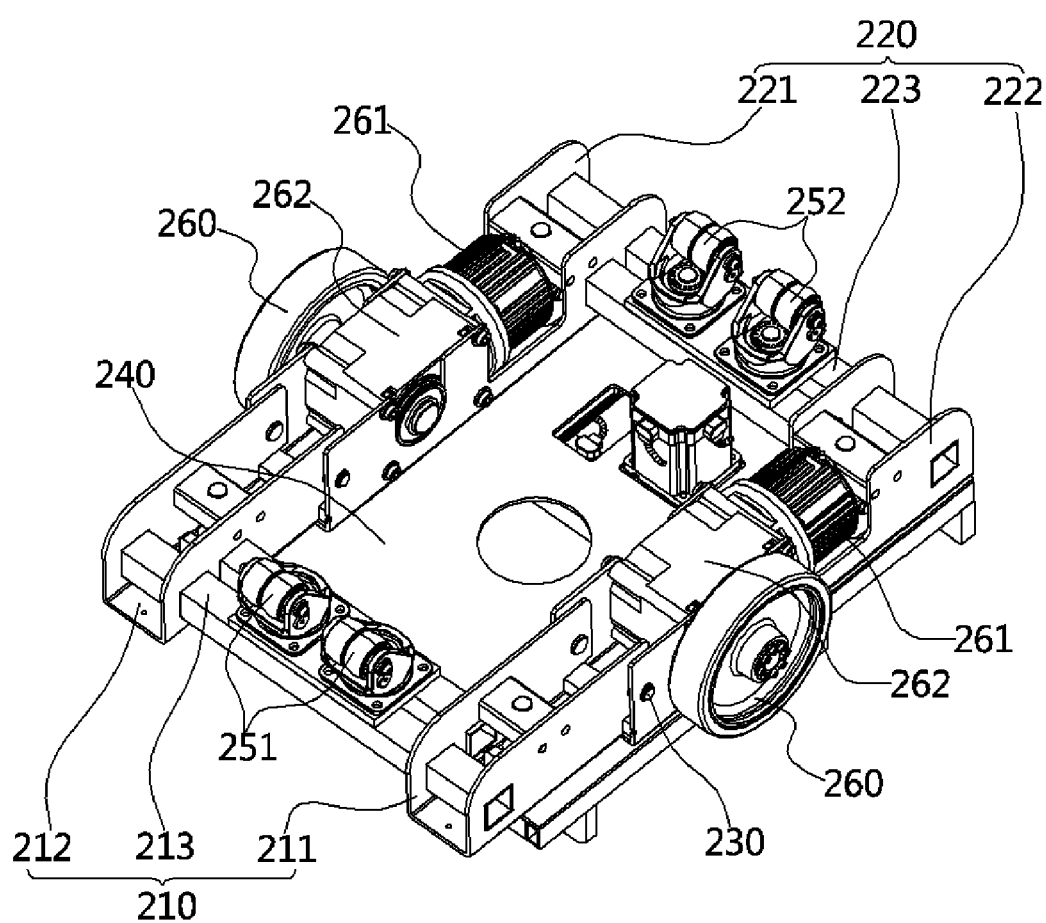

[FIG.8]
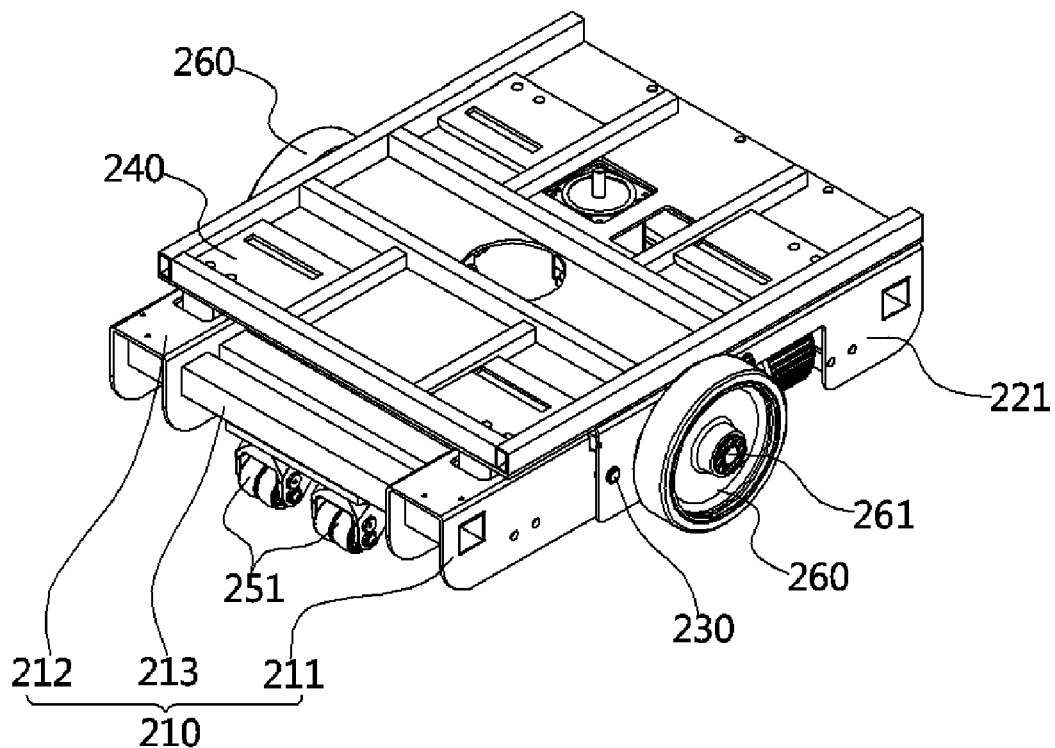
[FIG.9A]
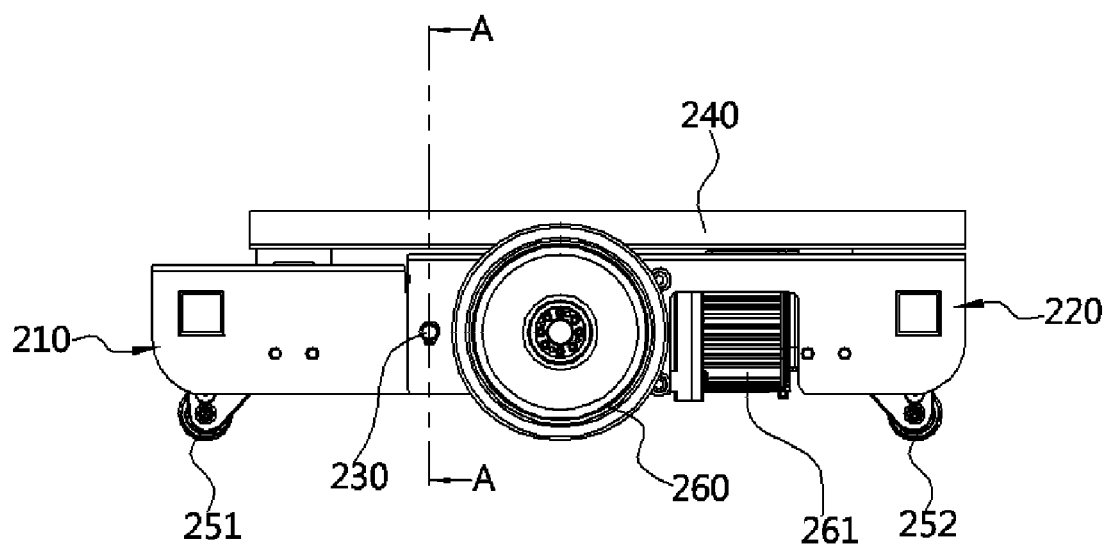

[FIG.9B]
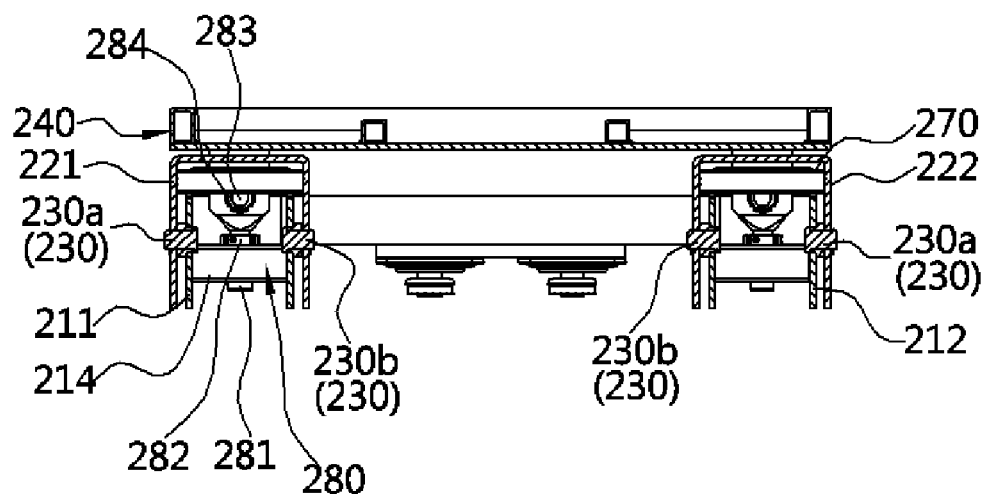
[FIG.10]
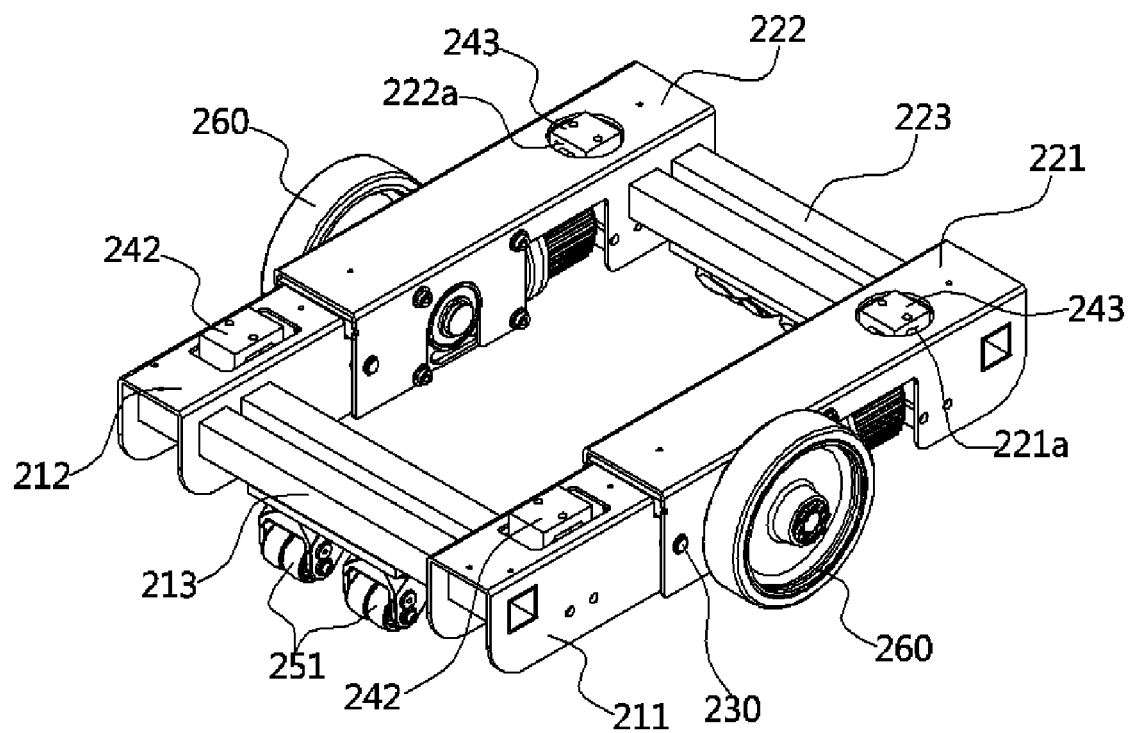

[FIG.11]
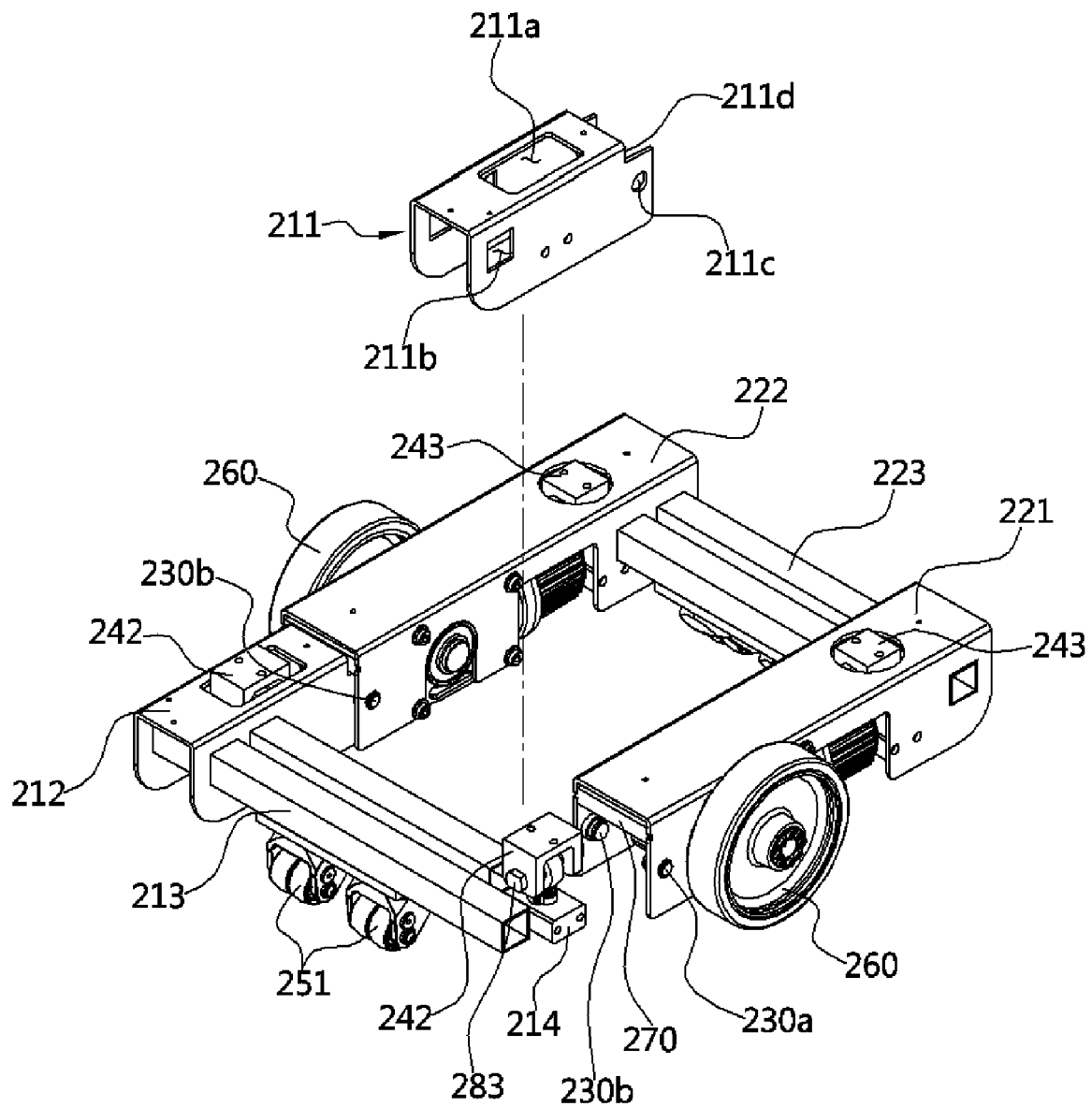

[FIG.12]
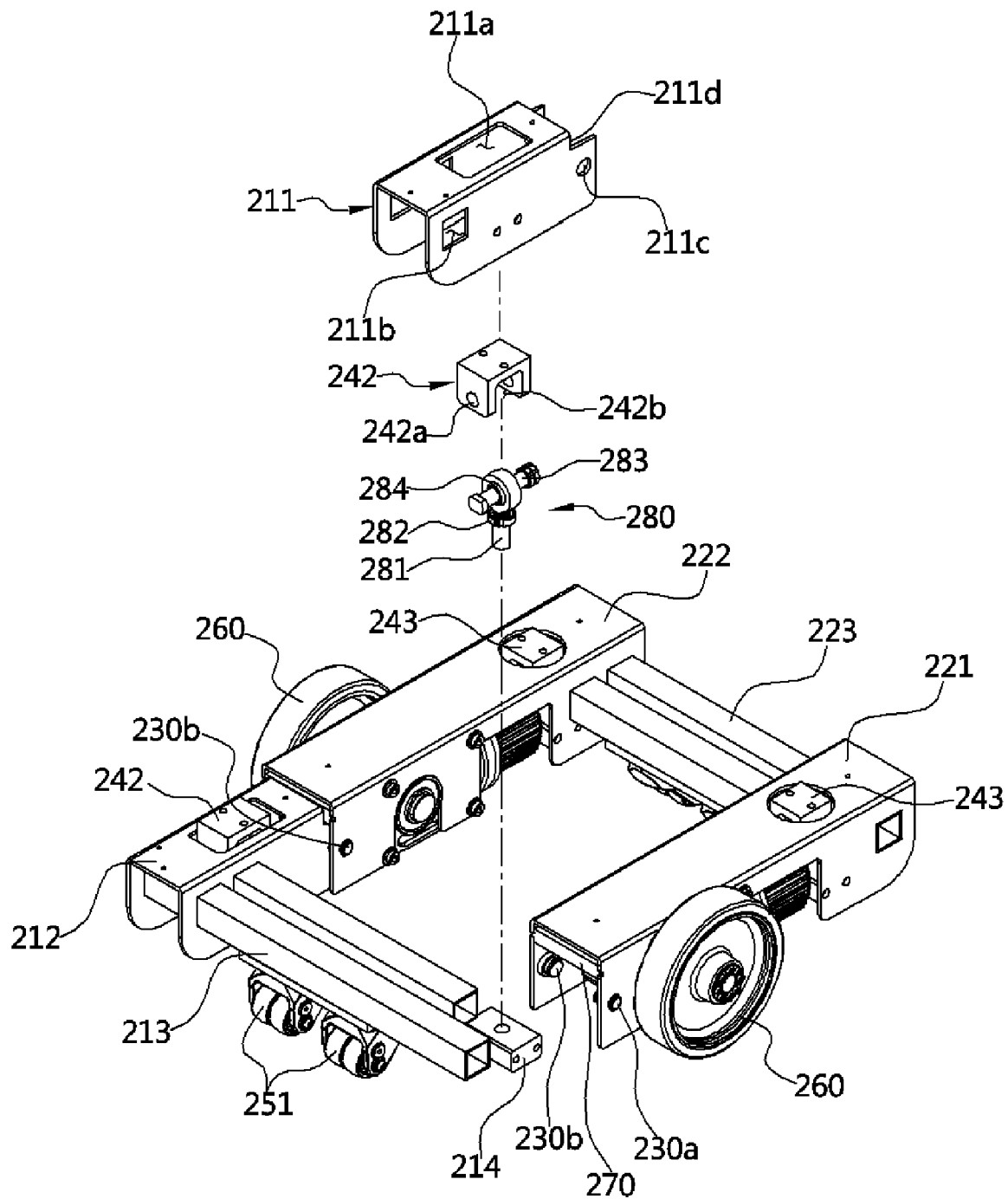

[FIG.13A]
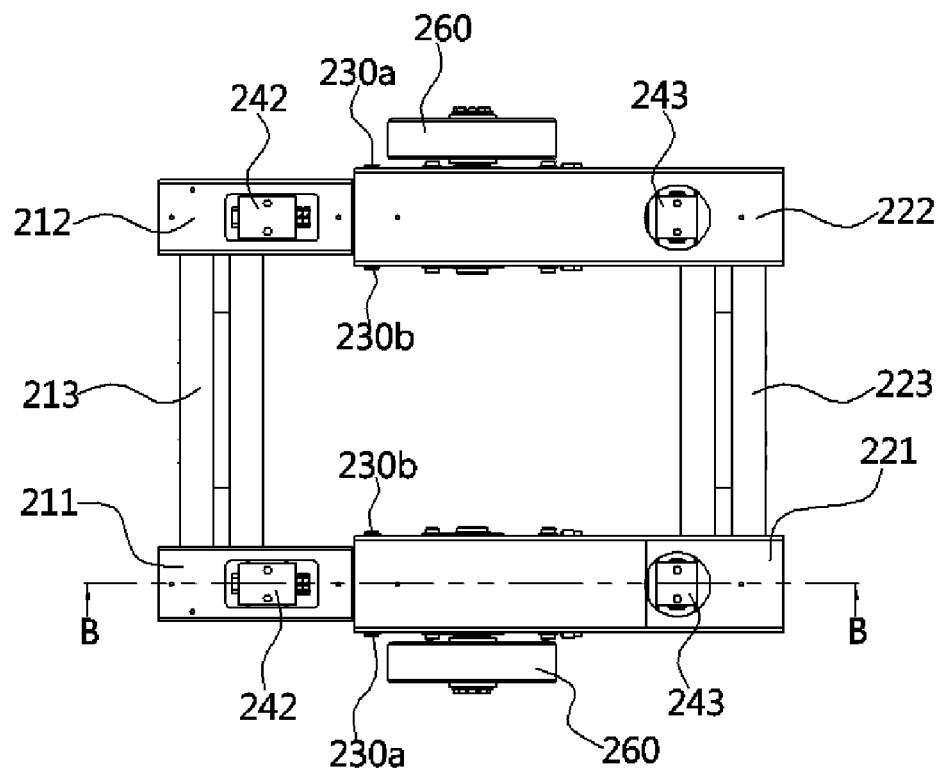
[FIG.13B]
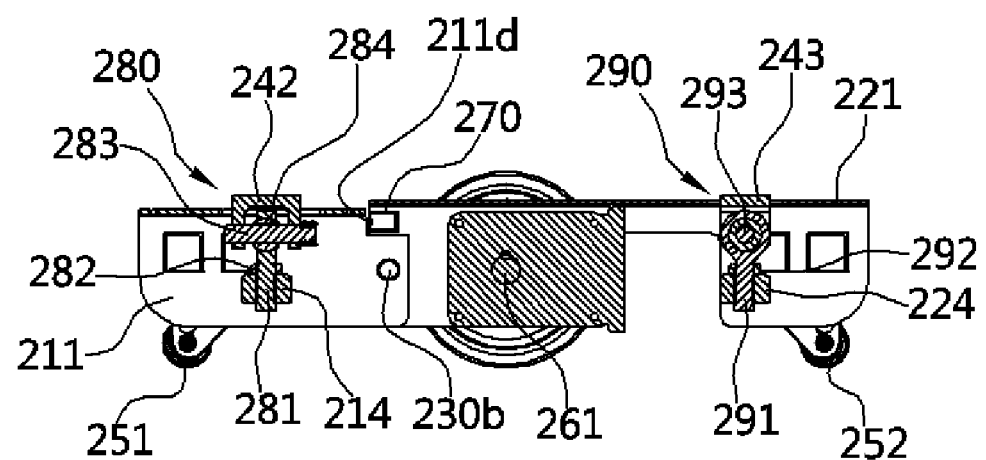

DRIVING APPARATUS MAINTAINING GROUND CONTACT OF DRIVE-WHEEL

CROSS-REFERENCE TO RELATED APPLICATIONS

This application is the U.S. National Phase under 35 U.S.C. § 371 of International Application No. PCT/KR2019/018623 filed on Dec. 27, 2019, which in turn claims the benefit of Korean Application No. 10-2019-0143179, filed on Nov. 11, 2019, the disclosures of which are incorporated by reference into the present application.

TECHNICAL FIELD

The present invention relates to a driving apparatus for maintaining a ground contact of a drive-wheel, and more particularly, to a driving apparatus which allows a drive-wheel to always maintain a state of being in contact with the ground even when a stepped level is present on the ground while traveling in a state in which a loaded object is loaded on the driving apparatus.

BACKGROUND ART

In various industrial sites, there are many cases in which it is necessary to move various parts and products being manufactured or complete products to a specific place in a workplace, and a transport vehicle for work is used in the above cases. The most common form of the transport vehicle is a form in which a plurality of casters are installed on a bottom surface of a loading platform to facilitate movement and a direction change, and a handle is installed on one side of the loading platform to allow the transport vehicle to be moved manually.

Currently, transport vehicles have been developed in various structures according to types of goods to be conveyed and their purposes of use. The manually movable transport vehicle is required to be moved to a location of an object to be directly loaded by a worker so that a problem occurs in that the location of the object can be misidentified.

In addition, since the worker should directly move the transport vehicle, a transport time and a large amount of labor of the work are required, resulting in a problem of increasing a transport cost.

In order to solve the above problems, a logistics transport system using a robot is known. A logistics transport system using a robot is disclosed in Korean Registered Patent No. 10-1642728.

Meanwhile, virtual game systems have been developed in which game users play virtual games in a state in which the game users ride in vehicles. The vehicle on which the game user rides is provided with a chair so as to allow the game user to sit on an upper portion of the loading platform, and the vehicle is traveling in an indoor space in a state in which the game user rides on the chair.

A loading plate is provided on an upper portion of the robot of the logistics transfer system, and the logistics transfer system drives a drive-wheel to travel in a state of loading goods to be transferred on an upper portion of the loading plate. In addition, the vehicle for the virtual game also drives the drive-wheel to travel in a state in which the game user rides on the upper portion of the loading plate.

The drive-wheel is provided as a pair of drive-wheels on left and right sides of the robot or the vehicle, and casters are provided as driven-wheels in lower portions on front and rear sides of the robot or the vehicle.

As described above, when the drive-wheels are rotated and driven to travel and a ground surface is uneven, there is a problem in that the drive-wheel cannot be in contact with the ground so that a driving force of the driver cannot be transmitted to the drive-wheel.

DISCLOSURE

Technical Problem

The present invention is directed to providing a driving apparatus for transporting a loaded object, which allows a drive-wheel to always be in contact with the ground even when the ground is uneven.

Technical Solution

One aspect of the present invention provides a driving apparatus including a loading plate (140, 240) on which a loaded object is loaded, a first support (110, 210) connected to a lower portion of one side of the loading plate (140, 240), a second support (120, 220) connected to a lower portion of the other side of the loading plate (140, 240), a hinge (130, 230) configured to connect the first support (110, 210) to the second support (120, 220) in a hinge structure, at least a pair of drive-wheels (160, 260) coupled to both sides of a lower portion of the second support (120, 220), and a driver configured to rotate and drive the drive-wheels (160, 260).

A first connector, which connects the loading plate (140, 240) to the first support (110, 210), and a second connector, which connects the loading plate (140, 240) to the second support (120, 220), may be connected to allow the loading plate (140, 240) and the first support (110, 210) to be relatively pivoted and may be connected to allow the loading plate (140, 240) and the second support (120, 220) to be relatively pivoted.

When the first support (110, 210) or the second support (120, 220) is pivoted about the hinge (130, 230), the loading plate (140, 240) may be provided to be pivoted only using one of the first connector and the second connector and provided to be pivoted using the remaining one of the first connector and the second connector and, simultaneously, to allow a center of pivoting to be slide-movable along a traveling direction.

The second support (120, 220) may be connected to the loading plate (140, 240) through a pin so as to be pivoted only using the second connector and connected to the loading plate (140, 240) with a structure in which a pin with a long hole having a length in the traveling direction is coupled to allow the second support (120, 220) to be pivoted and, simultaneously, to be slide-movable using the first connector.

A distance of slide movement in the traveling direction may be limited.

A ball joint may be provided in the first connector to allow the pivoting to be freely performed. In this case, the first connector may be formed with a joint structure including a slide shaft (283) having a length in a linear direction, a ball (284) freely rotatably coupled to the slide shaft (283), and a shaft (281) of which one end portion is fixed to the first support (110) and the other end portion is coupled to the ball (284).

The driving apparatus may further include a stopper configured to limit a pivoting angle when the first support and the second support are relatively pivoted.

The pair of drive-wheels (160) may be coupled to both sides of a front side of the second support (210), and the driving apparatus may further include at least one driven-wheel (151 or 251) coupled to a lower portion of the first support (110 or 210), and at least one driven-wheel (152 or 252) coupled to the lower portion of the second support (120, 220).

The first support (210) may include a pair of first support frames (211 and 212) each having a length in a front-rear direction and provided on both sides of a front side, and a first connection frame (213) configured to connect the pair of first support frames (211 and 212), each of the first support frames (211 and 212) may have a vertical cross section of a ∩ shape and may be provided with a loading plate coupling member (242) coupled to the lower portion of the loading plate (240) through a through-hole (211a) formed on an upper surface of each of the first support frames (211 and 212), and the first connector may be provided in a lower portion of the loading plate coupling member (242).

The hinge (130, 230) may be provided to be pivotable about a shaft extending in a direction perpendicular to the traveling direction.

Advantageous Effects

In accordance with the present invention, even when the ground is uneven and a driving device is traveling, the driving device allows a drive-wheel to always be in contact with the ground so that a driving force of a driver can be transmitted to the drive-wheel.

In addition, even when a front side or a rear side of the driving device is lifted due to uneven ground, the driving device allows a connector, to which a loading plate and a support are connected, to be slid so that an amount of lifting of the loading plate can be minimized.

DESCRIPTION OF DRAWINGS

FIG. 1 is a perspective view illustrating a driving apparatus device according to a first embodiment of the present invention.

FIG. 2 is a side view illustrating the driving apparatus of FIG. 1.

FIG. 3 is a perspective view illustrating a bottom surface of the driving apparatus of FIG. 1.

FIG. 4 is 4 is a perspective view illustrating a loading plate of the driving apparatus of FIG. 1.

FIG. 5A is a diagram illustrating a state in which a first support is lifted in the driving apparatus of FIG. 1.

FIG. 5B is a diagram illustrating a state in which a second support is lifted in the driving apparatus of FIG. 1.

FIG. 6 is a perspective view illustrating a driving apparatus device according to a second embodiment of the present invention.

FIG. 7 is a perspective view illustrating a bottom surface of the driving apparatus of FIG. 6.

FIG. 8 is a perspective view illustrating a state in which a loaded object is removed from the driving apparatus of FIG. 6.

FIG. 9A is a side view illustrating the driving apparatus of FIG. 6.

FIG. 9B is a cross-sectional view taken along line A-A shown in FIG. 9A.

FIG. 10 is a perspective view illustrating a state in which a loaded object is removed from FIG. 8.

FIG. 11 is a perspective view illustrating a state in which a first support frame is disassembled from FIG. 10.

FIG. 12 is a perspective view illustrating a state in which a first connector is disassembled from FIG. 11.

FIG. 13A is a plan view illustrating a state in which the loading plate is removed from FIG. 8.

FIG. 13B is a cross-sectional view taken along line B-B shown in FIG. 13A.

DESCRIPTION OF REFERENCE NUMERALS

| | |
|---|---|
| 110, 210: first support | 111: first support frame |
| 112: first support coupling member | 113a, 113b: first hinge connector |
| 120, 220: second support | 121: second support frame |
| 122: second support coupling member | 123a, 123b: second hinge connector |
| 130, 230: hinge | 140, 240: loading plate |
| 142, 143, 144, 145: loading plate coupler | |
| 142a, 143a, 144a, 145a: through-hole | 151, 152, 251, 252: driven-wheel |
| 160, 260: drive-wheel | 171: first hinge shaft |
| 172: second hinge shaft | 211, 212: first support frame |
| 213: first connection frame | 221, 222: second support frame |
| 223: second connection frame | 242, 243: loading plate coupling member |
| 270: stopper | 280: first joint |
| 281: shaft | 283: slide shaft |
| 284: ball | 290: second joint |
| 291: shaft | 293: third hinge shaft |

MODES OF THE INVENTION

Hereinafter, the present invention will be described in detail with reference to the accompanying drawings.

A driving apparatus of the present invention is used in industrial sites and may be a logistics transport robot which automatically transports products to a target place in a state of loading the products or a vehicle which travels in a state in which a game user rides for a virtual game. In addition to such a logistics transport robot and a virtual game vehicle, the present invention may be applied to all driving apparatus traveling in a state in which a loaded object is loaded on a loading plate.

First Embodiment

A configuration of a driving apparatus according to a first embodiment of the present invention will be described in detail with reference to FIGS. 1 to 4.

A driving apparatus 100 according to the first embodiment of the present invention includes a loading plate 140 on which a loaded object 101 is loaded, a first support 110 connected to a lower portion of one side of the loading plate 140, a second support 120 connected to a lower portion of the other side of the loading plate 140, a hinge 130 connecting the first support 110 and the second support 120 in a hinge structure to allow the first support 110 and the second support 120 to be relatively rotated, at least one pair of drive-wheels 160 coupled to two sides of a lower side of the second support 120, at least one driven-wheel 151 coupled to a lower portion of the first support 110, and a driver for rotating and driving the drive-wheel 160.

Here, in defining a direction, on the basis of the loading plate 140, the first support 110 is defined as being located at a front side, and the second support 120 is defined as being located at a rear side. In addition, the front side and the rear side are defined to mean forward and rearward in a traveling direction in which the driving apparatus 100 travels. The forward and the rearward in the traveling direction may be formed oppositely to the above description. In addition, the above description is equally applied to describe a second embodiment.

The hinge 130 connects a rear end portion of the first support 110 to a front end portion of the second support 120 in a hinge structure to allow the first support 110 and the second support 120 to be relatively pivoted about a first hinge shaft in a left-right direction perpendicular to the traveling direction.

The first hinge shaft may be formed as one connected shaft or a plurality of shafts having the same center of rotation.

As shown in FIG. 4, the loading plate 140 includes a loading plate body 141 formed in a quadrangular flat plate shape, a pair of loading plate couplers 142 and 143 protruding from one side located on a front side of the loading plate body 141 in a direction toward the first support 110, and a pair of loading plate couplers 144 and 145 protruding from the other side located on a rear side of the loading plate body 141 in a direction toward the second support 120.

Through-holes 142a and 143a are formed in the pair of loading plate couplers 142 and 143 facing the first support 110. Each of the through-holes 142a and 143a is formed in a shape passing through the loading plate couplers 142 and 143 in two end directions thereof perpendicular to the traveling direction.

In addition, the through-holes 142a and 143a may be formed of long holes in the traveling direction to implement a slide movement structure to allow the first support 110 or the second support 120 to be pivoted about the hinge 130.

Through-holes 144a and 145a are formed in the pair of loading plate couplers 144 and 145 facing the second support 120. Each of the through-holes 144a and 145a is formed in a shape passing through the loading plate couplers 144 and 145 in two end directions thereof perpendicular to the traveling direction. A cross section of each of the through-holes 144a and 145a is formed in a circular shape.

The first support 110 is formed in a stepped shape in which forward in the traveling direction is high and rearward in the traveling direction is low. That is, the first support 110 includes a first support front portion 110a which is a high position as the forward in the traveling direction, a first support rear portion 110c which is a low position as the rearward in the traveling direction, and a first support connector 110b connected between the first support front portion 110a and the first support rear portion 110c and formed in an inclined shape.

The second support 210 is formed in a stepped shape in which the rearward in the traveling direction is high and the forward in the traveling direction is low. That is, the second support 120 includes a second support front portion 120a which is a low position as the forward in the traveling direction, a second support rear portion 120c which is a high position as the rearward in the traveling direction, and a second support connector 120b connected between the second support front portion 120a and second support rear portion 120c and formed in an inclined shape.

As shown in FIG. 2, an upper surface of the loading plate 140 may be provided at a position that is higher than a position of an upper surface of the first support front portion 110a and a position of an upper surface of the second support rear portion 120c.

A first connector is provided to connect a front end portion of the loading plate 140 to the first support 110. The first connector may include a first support frame 111, a first support coupling member 112, and a second hinge shaft 171 for coupling the first support coupling member 112 to the loading plate couplers 142 and 143 in a hinge structure. First connectors are provided with the same configuration on both sides of the first support 110.

The first support frame 111 includes a first support frame horizontal portion 111a having a length in the front-rear direction to allow a portion of the front side thereof to be hung on the first support front portion 110a, a first support frame central part 111b having a length in the left-right direction and coupled to a rear end portion of the first support frame horizontal portion 111a, and a first support frame vertical portion 111c having a length in a vertical direction to allow an upper end portion thereof to be coupled to the first support frame central part 111b and allow a lower end portion to be supported on an upper surface of the first support rear portion 110c.

A pair of the first support frame horizontal portion 111a and the first support frame vertical portion 111c are coupled to the first support frame central part 111b, and a plurality of pairs of the first support frame horizontal portion 111a and the first support frame vertical portion 111c are provided in the left-right direction.

The first support coupling member 112 includes a front coupler 112a coupled to the first support frame central part 111b, and a rear coupler 112b which is an upper side of the front coupler 112a and of which a rear end surface is coupled to the loading plate coupler 142 or 143 of the loading plate 140. In the rear coupler 112b, a pair of plates facing each other are spaced by a predetermined distance in the left-right direction, and the loading plate coupler 142 or 143 is inserted into a space between the pair of plates.

A coupling hole 112c is formed in each of the pair of plates constituting the rear coupler 112b, and the second hinge shaft 171 is coupled by passing through the coupling hole 112c and the through-holes 142a and 143a formed in the loading plate couplers 142 and 143 so that a hinge structure is formed.

The second hinge shaft 171 constitutes a shaft extending in a direction (horizontal direction) perpendicular to the traveling direction of the driving apparatus 100, and the loading plate 140 and the first support 110 may be relatively pivoted about the second hinge shaft 171 as a center of pivoting.

A second connector is provided to connect a rear end portion of the loading plate 140 to the second support 120. The second connector may include a second support frame 121, a second support coupling member 122, and a third hinge shaft 172 for coupling the second support coupling member 122 to the loading plate couplers 144 and 145 in a hinge structure.

The second support frame 121 includes a second support frame horizontal portion 121a having a length in the front-rear direction to allow a portion of the rear side thereof to be hung on the second support rear portion 120c, a second support frame central portion 121b having a length in the left-right direction and coupled to a front end portion of the second support frame horizontal portion 121a, and a second support frame vertical portion 121c having a length in a vertical direction to allow an upper end portion thereof to be coupled to the second support frame central portion 121b and allow a lower end portion to be supported on an upper surface of the second support front portion 120a.

A pair of the second support frame horizontal portion 121a and the second support frame vertical portion 121c are coupled to the second support frame central portion 121b, and a plurality of pairs of the second support frame horizontal portion 121a and the second support frame vertical portion 121c are provided in the left-right direction.

The second support coupling member 122 is provided to connect and couple the second support frame 121 to the loading plate 140.

The second support frame 121 may be installed in a shape and a structure which are symmetrical to the first support frame 111 on the basis of a vertical surface having a length in the left-right direction.

In addition, the second support coupling member 122 may be formed in the same shape as the first support coupling member 112 and installed in a shape and a structure which are symmetrical to the first support coupling member 112 on the basis of the vertical surface having the length in the left and right direction.

In the second support coupling member 112, a pair of plates are spaced by a predetermined distance in the left-right direction, and the loading plate coupler 144 or 145 is inserted into a space between the pair of plates.

A coupling hole is formed in each of the pair of plates, and the third hinge shaft 172 is coupled by passing through the coupling hole and the through-holes 144a and 143a formed in the loading plate couplers 144 and 145 so that a hinge structure is formed.

The third hinge shaft 172 constitutes a shaft extending in a direction (horizontal direction) perpendicular to the traveling direction of the driving apparatus 100, and the loading plate 140 and the second support 120 may be relatively pivoted about the third hinge shaft 172 as a center of pivoting.

Referring to FIG. 3, a pair of first hinge connectors 113a and 113b are formed to protrude rearward from a rear end portion of the first support rear portion 110c. The pair of first hinge connectors 113a and 113b are spaced apart from each other in the left-right direction. A through-hole (not shown) is formed to pass through each of the first hinge connectors 113a and 113b in the left-right direction.

A pair of second hinge connectors 123a and 123b is formed to protrude forward from a front end portion of the second support front portion 120a. The pair of second hinge connectors 123a and 123b are spaced apart from each other in the left-right direction and provided to be located between the pair of first hinge connectors 113a and 113b. A through-hole (not shown) is formed to pass through each of the second hinge connectors 123a and 123b in the left-right direction.

The first hinge connector 113a is provided adjacent to the second hinge connector 123a, the through-hole of the first hinge connector 113a is located to correspond to the through-hole of the second hinge connector 123a, and a first hinge shaft is inserted into these through-holes to form a hinge structure.

The first hinge connector 113b is also provided adjacent to the second hinge connector 123b, and the first hinge shaft is inserted in a state in which the through-holes formed in the first hinge connector 113b and the second hinge connector 123b are located to correspond to each other so that a hinge structure is formed.

As described above, when the hinge 130 is provided, the first support 110 and the second support 120 may be relatively pivoted about the hinge 130.

The pair of drive-wheels 160 are coupled to both end portions of the second support front portion 120a. A driver (not shown) is provided to rotate and drive the drive-wheel 160. The driver may include a motor and a reduction gear.

A pair of driven-wheels 151 provided in a lower portion of the first support front portion 110a may be coupled to a bottom surface of the first support 110 by being spaced apart from each other in the left-right direction.

In addition, at least one driven-wheel 152, preferably, a pair of driven-wheels 152 spaced apart from each other in the left-right direction, may be further provided in a lower portion of the second support rear portion 120c.

A pivoting operation about the hinge 130 in the driving apparatus 100 according to the first embodiment will be described with reference to FIGS. 2, 5A, and 5B.

As shown in FIG. 2, when the ground is flat and even, relative pivoting does not occur in the hinge 130, and the first support 110, the second support 120, and the loading plate 140 remain in a horizontal state, and all of the drive-wheel 160, the driven-wheel 151 in the front side, and the driven-wheel 152 in the rear side are maintained in a state of being in contact with the ground.

Referring to FIG. 5A, ground with which the drive-wheel 160 and the driven-wheel 152 provided in a lower portion of the second support 120 are in contact is indicated as A, and ground with which the driven-wheel 151 provided in the lower portion of the first support 110 is in contact is indicated as B. Ground B is a ground level that is higher than a ground level of Ground A. In this case, the first support 110 is in a state of being pivoted about the hinge 130 as a center of pivoting in a clockwise direction. Thus, the drive-wheel 160 is not lifted from the ground so as to remain in a state of being in contact with Ground A. In addition, both the driven-wheels 151 and 152 remain in a state of being in contact with the ground.

When the first support 110 is pivoted about the hinge 130 in the clockwise direction, the loading plate 140 is pivoted about the third hinge shaft 172 as a center of pivoting in the clockwise direction so that the front side of the loading plate 140 is lifted in an upward direction. That is, since the third hinge shaft 172 is a pin having a fixed center of rotation, the center of rotation in the third hinge shaft 172 is not moved in the front-rear direction, and, in a state in which the center of rotation is fixed, the loading plate 140 and the second support 120 are relatively pivoted.

In this case, a slide movement in the front-rear direction should be possible in the first connector in which a front portion of the loading plate 140 is connected to the first support 110 so that the first support 110 is allowed to be pivoted about the hinge 130.

To this end, the second hinge shaft 171 of the first connector is provided to be moved forward in the through-hole 142a which is a long hole having a length in the front-rear direction. In other words, in the second hinge shaft 171, at the same time as rotation, the center of rotation is allowed to be slide-moved in the traveling direction. Referring to an enlarged view of FIG. 5A, the second hinge shaft 171 in the first connector allows the loading plate 140 and the first support 110 to be relatively pivoted and, simultaneously, is in a state of being slide-moved forward in the through-holes 142a and 143a.

In this case, since the second hinge shaft 171 is movable in only the through-holes 142a and 143a, a distance of the slide movement is limited by a length of each of the through-holes 142a and 143a. When an angle of relative pivoting between the first support 110 and the loading plate 140 is allowed to be too large and the first support 110 is relatively pivoted about the hinge 130, pivoting angles of parts connected to the second hinge shaft 171 as a center of pivoting are increased so that an excessive load may be applied to the connected parts or damage may occur in the connected parts. Therefore, by limiting the distance of slide movement of the second hinge shaft 171, it is possible to prevent the angle of relative pivoting from becoming excessively larger to prevent the connected parts from being damaged.

In addition, as compared with a structure in which the second hinge shaft 171 is not slide-moved, when the second hinge shaft 171 is slide-moved, an angle at which the loading plate 140 is pivoted in the clockwise direction may be reduced so that a loading state of the loaded object may be more stably maintained.

Referring to FIG. 5B, ground with which the drive-wheel 160 and the driven-wheel 151 provided in a lower portion of the first support 110 are in contact is indicated as A, and ground with which the driven-wheel 152 provided in a lower portion of the second support 120 is in contact is indicated as B. Ground B is a ground level that is higher than a ground level of Ground A.

In this case, the second support 120 is in a state of being pivoted about the hinge 130 as the center of pivoting in a counterclockwise direction, and the loading plate 140 is also pivoted about the second hinge shaft 171 as the center of pivoting according to the rotation of the second support 120 in the counterclockwise direction.

The first support 110 and the loading plate 140 are relatively pivoted and, simultaneously, the center of rotation of the second hinge shaft 171 is slide-moved in the second hinge shaft 171, and the second support 120 and the loading plate 140 are relatively pivoted in the third hinge shaft 172.

Thus, the drive-wheel 160 is not lifted from the ground so as to remain in a state of being in contact with Ground A. Therefore, it is possible to prevent the drive-wheel 160 from spinning with no traction due to separation of the drive-wheel 160 from the ground. In this case, both the driven-wheels 151 and 152 remain in a state of being in contact with the ground.

Second Embodiment

A configuration of a driving apparatus according to a second embodiment of the present invention will be described in detail with reference to FIGS. 6 to 12.

A driving apparatus 200 according to the second embodiment of the present invention includes a loading plate 240 on which a loaded object 201 is loaded, a first support 210 connected to a lower portion of one side of the loading plate 240, a second support 220 connected to a lower portion of the other side of the loading plate 240, a hinge 230 connecting the first support 210 and the second support 220 in a hinge structure to allow the first support 210 and the second support 220 to be relatively rotated, at least one pair of drive-wheels 260 coupled to two sides of a lower side of the second support 220, at least one driven-wheel 251 coupled to a lower portion of the first support 210, and drivers 261 and 262 for rotating and driving the drive-wheels 260.

The hinge 230 connects a rear end portion of the first support 210 to a front end portion of the second support 220 in a hinge structure to allow the first support 210 and the second support 220 to be relatively pivoted about a shaft extending in a direction perpendicular to a traveling direction.

As shown in FIG. 9, the hinge 230 may include first hinge shafts 230a and 230b which are provided in the left-right direction perpendicular to the traveling direction. Each of the first hinge shafts 230a and 230b may be formed as one connected shaft or a plurality of shafts having the same center of rotation. FIG. 9 illustrates an embodiment in which each of the first hinge shafts 230a and 230b are formed as a plurality of shafts.

As shown in FIG. 8, the loading plate 240 is formed in a quadrangular flat plate shape. The loaded object 201 is loaded on the loading plate 240. The loaded object 201 may include a simulator for a virtual game and a chair on which a game user sits. In addition, the loaded object 201 may be a driver for vertically ascending and descending or rotating the chair.

The first support 210 includes a pair of first support frames 211 and 212 each having a length in the front-rear direction and provided on both sides of the first support 210 in the traveling direction, and a first connection frame 213 connecting the pair of first support frames 211 and 212. Since the first support frame 211 of one side and the first support frame 212 of the other side are provided in a symmetrical structure by interposing the first connection frame 213 therebetween, hereinafter, even when a duplicate description is omitted, the first support frame 211 and the first support frame 212 are formed with the same configuration in a symmetrical structure.

Referring to FIG. 11, the first support frames 211 and 212 each have a vertical cross section of a ∩ shape, through-holes 211a are formed on upper surfaces of the first support frames 211 and 212, frame coupling holes 211b through which the first connection frame 213 passes to couple are formed on both lateral surfaces thereof, and first hinge shaft coupling holes 211c to which the first hinge shafts 230a and 230b are inserted and coupled are formed at rear sides of the both lateral surfaces. In addition, a contact portion 211d having an incised shape is formed in a rear upper portion of each of the first support frames 211 and 212 to limit a pivoting range by being brought into contact with a stopper 270 which will described below.

A loading plate coupling member 242 is vertically inserted to pass through the through-hole 211a. An upper end portion of the loading plate coupling member 242 passes through the through-hole 211a, protrudes upward from the upper surface of each of the first support frames 211 and 212, and is coupled to the lower portion of the loading plate 240, thereby supporting a front lower portion of the loading plate 240.

The first connection frame 213 is formed to have a length in the left-right direction, and both end portions thereof are inserted into and coupled to the frame coupling holes 211b of each of the pair of first support frames 211 and 212. A pair of driven-wheels 251 are coupled to a lower portion of the first connection frame 213.

The second support 220 includes a pair of second support frames 221 and 222 each having a length in the front-rear direction and provided on both sides of the second support 220 in the traveling direction, and a second connection frame 223 connecting the pair of second support frames 221 and 222. Since the second support frame 221 of one side and the second support frame 222 of the other side are provided in a symmetrical structure by interposing the second connection frame 223 therebetween, hereinafter, even when a duplicate description is omitted, the first support frame 211 and the second support frame 212 are formed with the same configuration in a symmetrical structure.

The second support frame 221 has the same cross-sectional shape as the first support frame 211 and is formed to have a cross-sectional area that is greater than a cross-sectional area of the first support frame 211. Thus, in a state in which a rear end portion of the first support frame 211 is inserted into an inner space of a front side of the second support frame 221, the second support frame 221 is connected in a hinge structure by the first hinge shafts 230a and 230b.

A through-hole 221a is formed in an upper surface of the second support frame 221, and a loading plate coupling member 243 is vertically inserted to pass through the through-hole 221a. An upper end portion of the loading plate coupling member 243 passes through the through-hole 221a, protrudes upward from the upper surface of the second support frame 221, and is coupled to the lower portion of the loading plate 240, thereby supporting a rear lower portion of the loading plate 240.

The second connection frame 223 is formed in the same shape as the first connection frame 213 and both ends thereof are coupled to the pair of second support frames 221 and 222.

The first hinge shafts 230a and 230b are provided on both sides of the front side of the second support frame 221 and are inserted into the first hinge shaft coupling holes 211c formed in the first support frame 211. The first hinge shafts 230a and 230b are provided with the same structure in a front side of the second support frame 222.

A first connector is provided to connect a front end portion of the loading plate 240 to the first support 210. The first connector may include the loading plate coupling member 242, a frame coupling member 214, and a first joint 280 connecting the loading plate coupling member 242 and the frame coupling member 214. The first connector is provided with the same configuration on both sides of the first support 210.

The frame coupling member 214 is provided in a lower portion of the loading plate coupling member 242 and provided in the first support frame 211 so that both ends thereof are coupled to both lateral surfaces of the first support frame 211.

The first joint 280 may include a slide shaft 283 having a length in the traveling direction (the front-rear direction), a ball 284 freely rotatably coupled to the slide shaft 283, and a shaft 281 of which one end portion is fixed to the first support frame 211 constituting the first support 210 and the other end is coupled to the ball 284. A ball joint structure is implemented using the ball 284, the shaft 281, and the slide shaft 283.

In the first joint 280, since the ball 284 is freely rotatably coupled to the slide shaft 283, the loading plate 240 and the first support 210 may be relatively pivoted about the first joint 280 as a center of pivoting.

A lower end portion of the shaft 281 is coupled to an upper portion of the frame coupling member 214 through an engagement member 282 so as to be supported on the frame coupling member 214 and the first support frame 211.

Since the ball 284 is freely rotatably coupled to the slide shaft 283, when the first support 210 and the second support 220 are pivoted about the hinge 230, the ball 284 may absorb a pivoting of the loading plate 240.

In addition, the ball 284 is formed with a structure of being slide-moved along the slide shaft 283 in the traveling direction (the front-rear direction). That is, the ball 284 is rotated with respect to the slide shaft 283 and, simultaneously, a center of rotation thereof is movable along a length direction of the slide shaft 283, which is the traveling direction. Thus, the first support 210 becomes pivotable about the hinge 230. In this case, a movement distance of the ball 284 is limited by a length of the slide shaft 283. In the present embodiment, the ball joint structure constitutes the second hinge shaft and performs the function of the second hinge shaft 171, which is described in the first embodiment.

Since the movement distance is limited by the length of the slide shaft 283, an angle of relative pivoting is prevented from becoming too large so that it is possible to prevent an excessive load from being applied to the connected parts or prevent occurrence of breakage.

In addition, since the ball 284 is moved along the slide shaft 283, an angle at which the loading plate 240 is pivoted may be decreased so that a loaded state of the loaded object 201 may be maintained more stably.

A second connector is provided to connect a rear end portion of the loading plate 240 to the second support 220. The second connector may include the loading plate coupling member 243, a frame coupling member 224 (see FIG. 13), and a second joint 290 connecting the loading plate coupling member 243 and the frame coupling member 224. The second connector is provided with the same configuration on both sides of the first support 210.

The second joint 290 includes a third hinge shaft 293 (see FIG. 13) having a length in the left-right direction perpendicular to the traveling direction (the front-rear direction), and a shaft 291 of which an upper end portion is rotatably coupled to the third hinge shaft 293 and a lower end portion is coupled to an upper portion of the frame coupling member 224.

The lower end portion of the shaft 291 is coupled to the upper portion of the frame coupling member 224 through an engagement member 292 so as to be supported on the frame coupling member 224 and the second support frame 221.

The third hinge shaft 293 constitutes a shaft extending in a direction (horizontal direction) perpendicular to the traveling direction of the driving apparatus 100, and the loading plate 240 and the second support 220 may be relatively pivoted about the third hinge shaft 293 as a center of pivoting.

The pair of drive-wheels 260 are coupled to front sides of the second support frames 221 and 222. A motor 261 and a reduction gear 262 may be provided as the drivers 261 and 262 for rotating and driving the drive-wheel 260.

At least one driven-wheel 252, preferably, a pair of driven-wheels 252 spaced apart from each other in the left-right direction, may be further provided in a lower portion of the second connection frame 223.

Meanwhile, the stopper 270 having a length in the left-right direction is provided in an upper portion of a front inner side of the second support frame 221. The stopper 270 is equally provided in the second support frame 222 of the other side. The stopper 270 is for preventing an angle of relative pivoting from becoming too large. When the first support 210 and the second support 220 are relatively pivoted about the hinge 230, the stopper 270 is brought into contact with the contact portion 211d formed in each of the first support frames 211 and 212 to limit the angle of pivoting.

When the above described driving apparatus 200 of the second embodiment is present at a position at which the ground is flat and even, relative pivoting does not occur in the hinge 230, and the first support 210, the second support 220, and the loading plate 240 remain in a horizontal state, and all of the drive-wheel 260, the driven-wheel 251 in the front side, and the driven-wheel 252 in the rear side are maintained in a state of being in contact with the ground.

As shown in FIG. 5A, when the ground is uneven and ground on which the driven-wheel 251 of the front side is located is higher than ground on which the drive-wheel 260 and the driven-wheel 252 of the rear side are located, the first support 210 is in a state of being pivoted about the hinge 230 as a center of pivoting in the clockwise direction. Thus, the drive-wheel 260 is not lifted from the ground so as to remain in a state of being in contact therewith. Therefore, it is possible to prevent the drive-wheel 260 from spinning with no traction due to separation of the drive-wheel 260 from the ground. In this case, both the driven-wheels 251 and 252 remain in a state of being in contact with the ground.

In this case, when the first support 210 is pivoted about the hinge 230 in the clockwise direction (here, a direction of pivoting is based on the state of FIG. 9A), the loading plate 240 is pivoted about the second hinge shaft 290 as a center of pivoting in the clockwise direction so that the front side of the loading plate 240 is lifted in an upward direction. That is, since the center of pivoting of the second joint 290 is fixed, the center of pivoting of the second joint 290 is not moved in the front-rear direction, and, in a state in which the center of pivoting is fixed, the loading plate 240 and the second support 220 are relatively pivoted.

In addition, as shown in FIG. 5B, when the ground is uneven and ground on which the driven-wheel 252 of the rear side is located is higher than ground on which the drive-wheel 260 and the driven-wheel 251 of the front side are located, the second support 220 is pivoted about the hinge 230 and the center of pivoting in the counterclockwise direction (here, a pivoting direction is based on the state of FIG. 9B), and according to the pivoting of the second support 220, the loading plate 240 is also pivoted about the first joint 280 as the center of pivoting in the counterclockwise direction.

In the first joint 280, the first support 210 and the loading plate 240 are relatively pivoted and, simultaneously, the center of pivoting of the first joint 280 is slide-moved, and the second support 220 and the loading plate 240 are relatively pivoted in the second joint 290.

In this case, the drive-wheel 260 is not lifted from the ground so as to remain in a state of being in contact therewith. Therefore, it is possible to prevent the drive-wheel 260 from spinning with no traction due to separation of the drive-wheel 260 from the ground. In this case, both the driven-wheels 251 and 252 remain in a state of being in contact with the ground.

In the above description, although the first embodiment and the second embodiment have been separately described, all components of the first embodiment are applicable to the second embodiment, and all components of the second embodiment are also applicable to the first embodiment.

As described above, although the exemplary embodiments of the present invention have been described in detail, the present invention is not limited to these embodiments, and various modifications can be practiced within the scope of the appended claims, the detailed description of the present invention, and the accompanying drawings, and these modifications also fall within the present invention.

The invention claimed is:

1. A driving apparatus for maintaining a ground contact of a drive-wheel, comprising:
   a loading plate (140, 240) on which a loaded object is loaded;
   a first support (110, 210) connected to a lower portion of one side of the loading plate (140, 240);
   a second support (120, 220) connected to a lower portion of the other side of the loading plate (140, 240);
   a hinge (130, 230) configured to connect the first support (110, 210) to the second support (120, 220) in a hinge structure;
   at least a pair of drive-wheels (160, 260) coupled to both sides of a lower portion of the second support (120, 220);
   a driver configured to rotate and drive the drive-wheels (160, 260);
   a first connector configured to connect a front end portion of the loading plate (140, 240) to the first support (110, 210) to allow the loading plate (140,240) and the first support (110, 210) to be relatively pivoted; and
   a second connector configured to connect a rear end portion of the loading plate (140, 240) to the second support (120, 220) to allow the loading plate (140,240) and the second support (120, 220) to be relatively pivoted.

2. The driving apparatus of claim 1, wherein, when the first support (110, 210) or the second support (120, 220) is pivoted about the hinge (130, 230), the loading plate (140, 240) is provided to be pivoted only using one of the first connector and the second connector and provided to be pivoted using the remaining one of the first connector and the second connector and, simultaneously, to allow a center of pivoting to be slide-movable along a traveling direction.

3. The driving apparatus of claim 2, wherein the second support (120, 220) is connected to the loading plate (140, 240) through a pin so as to be pivoted only using the second connector and connected to the loading plate (140, 240) with a structure in which a pin with a long hole having a length in the traveling direction is coupled to allow the second support (120, 220) to be pivoted and, simultaneously, to be slide-movable using the first connector.

4. The driving apparatus of claim 2, wherein a distance of slide movement in the traveling direction is limited.

5. The driving apparatus of claim 2, wherein a ball joint is provided in the first connector to allow the pivoting to be freely performed.

6. The driving apparatus of claim 5, wherein the first connector is formed with a joint structure including a slide shaft (283) having a length in a linear direction, a ball (284) freely rotatably coupled to the slide shaft (283), and a shaft (281) of which one end portion is fixed to the first support (110) and the other end portion is coupled to the ball (284).

7. The driving apparatus of claim 1, further comprising a stopper configured to limit a pivoting angle when the first support and the second support are relatively pivoted.

8. The driving apparatus of claim 1, wherein the pair of drive-wheels (160) are coupled to both sides of a front side of the second support (210),
   wherein the driving apparatus further includes:
   at least one driven-wheel (151, 251) coupled to a lower portion of the first support (110, 210); and
   at least one driven-wheel (152, 252) coupled to the lower portion of the second support (120, 220).

9. The driving apparatus of claim 1, wherein:
   the first support (210) includes a pair of first support frames (211 and 212) each having a length in a front-rear direction and provided on both sides of a front side, and a first connection frame (213) configured to connect the pair of first support frames (211 and 212);
   each of the first support frames (211 and 212) has a vertical cross section of a ∩ shape and is provided with a loading plate coupling member (242) coupled to the lower portion of the loading plate (240) through a through-hole (211a) formed on an upper surface of each of the first support frames (211 and 212); and
   the first connector is provided in a lower portion of the loading plate coupling member (242).

10. The driving apparatus of claim 1, wherein the hinge (130, 230) is provided to be pivotable about a shaft extending in a direction perpendicular to the traveling direction.

* * * * *